(12) United States Patent
Jiang et al.

(10) Patent No.: US 8,858,022 B2
(45) Date of Patent: Oct. 14, 2014

(54) SPOT TIR LENS SYSTEM FOR SMALL HIGH-POWER EMITTER

(75) Inventors: Wu Jiang, Sunnyvale, CA (US); Xiantao Yan, Palo Alto, CA (US); Debo A. Adebiyi, Fremont, CA (US)

(73) Assignee: LedEngin, Inc., San Jose, CA (US)

( * ) Notice: Subject to any disclaimer, the term of this patent is extended or adjusted under 35 U.S.C. 154(b) by 242 days.

(21) Appl. No.: 13/463,735

(22) Filed: May 3, 2012

(65) Prior Publication Data
US 2013/0120985 A1 May 16, 2013

Related U.S. Application Data (60) Provisional application No. 61/483,036, filed on May 5, 2011.

(51) Int. Cl.
| | |
|---|---|
| F21V 13/04 | (2006.01) |
| F21V 7/00 | (2006.01) |
| F21V 5/04 | (2006.01) |
| G02B 19/00 | (2006.01) |
| B29D 11/00 | (2006.01) |
| F21K 99/00 | (2010.01) |
| F21Y 101/02 | (2006.01) |
| F21Y 113/00 | (2006.01) |
| F21V 29/00 | (2006.01) |
| F21W 131/406 | (2006.01) |

(52) U.S. Cl.
CPC .............. *F21V 13/04* (2013.01); *F21Y 2101/02* (2013.01); *F21V 7/0091* (2013.01); *F21V 5/04* (2013.01); *G02B 19/0066* (2013.01); *G02B 19/0028* (2013.01); *B29D 11/00009* (2013.01); *F21K 9/00* (2013.01); *F21Y 2113/005* (2013.01); *F21V 29/2206* (2013.01); *F21W 2131/406* (2013.01)
USPC ...................................... 362/235; 362/249.02

(58) Field of Classification Search
CPC ....................................................... F21V 13/04

USPC .............................. 362/235, 244, 249.02, 327
See application file for complete search history.

(56) References Cited

U.S. PATENT DOCUMENTS 4,337,759 A * 7/1982 Popovich et al. ............. 126/684
4,698,730 A  10/1987 Sakai et al.
(Continued)

FOREIGN PATENT DOCUMENTS

JP  2000-349346 A  12/2000
JP  2000-349347 A  12/2000
(Continued)

OTHER PUBLICATIONS

Notice of Allowance for U.S. Appl. No. 13/338,936, mailed Jan. 22, 2013, 8 pages.

(Continued)

*Primary Examiner* — David V Bruce
(74) *Attorney, Agent, or Firm* — Kilpatrick Townsend and Stockton LLP (57) ABSTRACT

A lamp includes a single emitter structure having a substrate with 25 or more light emitting diodes (LEDs) arranged thereon and a power rating of 80 Watts or more, a total internal reflection (TIR) lens with a plurality of refractive surface regions disposed on the step-shaped upper surface of the optical body, and a holder having a plurality of tabs disposed along an inside rim of the holder and configured for radial compression fit with a flange of the lens, and three or more support members configured for centering the optical body member with respect to the single emitter structure. A low weight ratio of hardener over base resin below 6 is used, for example, between 1.5:1 to 2.5:1.

25 Claims, 10 Drawing Sheets

(56) References Cited

U.S. PATENT DOCUMENTS

| | | |
|---|---|---|
| 5,959,316 A | 9/1999 | Lowery |
| 6,307,160 B1 | 10/2001 | Mei et al. |
| 6,351,069 B1 | 2/2002 | Lowery et al. |
| 6,608,332 B2 | 8/2003 | Shimizu et al. |
| 6,614,179 B1 | 9/2003 | Shimizu et al. |
| 6,642,652 B2 | 11/2003 | Collins, III et al. |
| 6,680,128 B2 | 1/2004 | Mei |
| 6,682,331 B1 | 1/2004 | Peh et al. |
| 6,791,116 B2 | 9/2004 | Takahashi et al. |
| 6,828,170 B2 | 12/2004 | Roberts et al. |
| 7,049,159 B2 | 5/2006 | Lowery |
| 7,064,353 B2 | 6/2006 | Bhat |
| 7,156,538 B2 | 1/2007 | Han et al. |
| 7,157,744 B2 | 1/2007 | Palmteer et al. |
| 7,168,608 B2 | 1/2007 | Mei |
| 7,199,446 B1 | 4/2007 | Mei et al. |
| 7,264,378 B2 | 9/2007 | Loh |
| 7,465,069 B2 | 12/2008 | Li |
| 7,473,933 B2 | 1/2009 | Yan |
| 7,670,872 B2 | 3/2010 | Yan |
| 7,772,609 B2 | 8/2010 | Yan |
| 8,330,176 B2 | 12/2012 | Thompson et al. |
| 8,384,097 B2 | 2/2013 | Yan |
| 8,399,268 B1 | 3/2013 | Mei et al. |
| 2001/0015778 A1 | 8/2001 | Murade |
| 2002/0004251 A1 | 1/2002 | Roberts et al. |
| 2002/0015013 A1 | 2/2002 | Ragle |
| 2002/0163006 A1 | 11/2002 | Yoganandan et al. |
| 2002/0191885 A1 | 12/2002 | Wu et al. |
| 2003/0016899 A1 | 1/2003 | Yan |
| 2003/0086674 A1 | 5/2003 | Yan et al. |
| 2003/0095399 A1 | 5/2003 | Grenda et al. |
| 2003/0116769 A1 | 6/2003 | Song et al. |
| 2003/0230977 A1 | 12/2003 | Epstein |
| 2004/0004437 A1 | 1/2004 | Shimizu et al. |
| 2004/0051111 A1 | 3/2004 | Ota et al. |
| 2004/0079957 A1 | 4/2004 | Andrews et al. |
| 2004/0087165 A1 | 5/2004 | Theiss et al. |
| 2004/0102061 A1 | 5/2004 | Watanabe |
| 2004/0126918 A1 | 7/2004 | Kurahashi et al. |
| 2004/0201025 A1 | 10/2004 | Barnett |
| 2004/0257496 A1 | 12/2004 | Sonoda |
| 2005/0035364 A1 | 2/2005 | Sano et al. |
| 2005/0093146 A1 | 5/2005 | Sakano |
| 2005/0127281 A1 | 6/2005 | Zheng et al. |
| 2005/0145872 A1 | 7/2005 | Fang et al. |
| 2005/0179376 A1 | 8/2005 | Fung et al. |
| 2005/0199900 A1 | 9/2005 | Lin et al. |
| 2005/0224830 A1 | 10/2005 | Blonder et al. |
| 2005/0253242 A1 | 11/2005 | Costello et al. |
| 2005/0286131 A1 | 12/2005 | Saxena et al. |
| 2006/0012299 A1 | 1/2006 | Suehiro et al. |
| 2006/0063287 A1 | 3/2006 | Andrews |
| 2006/0082296 A1 | 4/2006 | Chua et al. |
| 2006/0082679 A1 | 4/2006 | Chua et al. |
| 2006/0091416 A1 | 5/2006 | Yan |
| 2006/0091788 A1 | 5/2006 | Yan |
| 2006/0097385 A1 | 5/2006 | Negley |
| 2006/0170332 A1 | 8/2006 | Tamaki et al. |
| 2006/0227558 A1 | 10/2006 | Osawa et al. |
| 2006/0284209 A1 | 12/2006 | Kim et al. |
| 2007/0023769 A1 | 2/2007 | Nishimoto et al. |
| 2007/0139437 A1 | 6/2007 | Boroson et al. |
| 2007/0241357 A1 | 10/2007 | Yan |
| 2010/0091491 A1 | 4/2010 | Jiang |
| 2010/0181582 A1 | 7/2010 | Li et al. |
| 2010/0259930 A1 | 10/2010 | Yan |
| 2011/0095686 A1 | 4/2011 | Falicoff et al. |
| 2012/0224363 A1 | 9/2012 | Van de Ven |

FOREIGN PATENT DOCUMENTS

| | | |
|---|---|---|
| JP | 2001-057445 A | 2/2001 |
| JP | 2002185046 A | 6/2002 |
| JP | 2004241704 A | 8/2004 |
| JP | 2004-253404 A | 9/2004 |
| WO | WO2009130944 A1 | 10/2009 |

OTHER PUBLICATIONS

Notice of Allowance for U.S. Appl. No. 12/756,861 mailed of Oct. 19, 2012, 7 pages.

Requirement for Restriction/Election for U.S. Appl. No. 13/338,936, mailed of Nov. 23, 2012, 4 pages.

Kading, "Thermal Conduction in Metallized Silicon-dioxide Layers on Silicon," Applied Physics Letter 65, 1994, pp. 1629-1631.

Yan et al., "Two Test Specimens for Determining the Interfacial Fracture Toughness in Flip-Chip Assemblies," Transactions of the ASME, vol. 120, Jun. 1998, p. 150.

Yan, Xiantao, "Analysis Based Design Guidelines for Metal Runner and Passivation Layers in IC Packaging," Delphi Automotive Systems Analytical Engineering Conference, May 2000, p. 1.

"Solvent Soluble Polyimide with High Transparency and High Tg: HOP-400, 500," Hitachi Cable Review, Aug. 2003, No. 22, p. 78.

Official Action for Japanese Patent Application No. 2005-315149, Japan Patent Office, Jul. 21, 2009, pp. 1-3, 1-2. (English translation not included).

Non-Final Office Action for U.S. Appl. No. 12/756,861, mailed on Jan. 18, 2012, 18 pages.

Notice of Allowance for U.S. Appl. 13/774,414 (Dec. 23, 2013) 10 pages.

Office Action from China Intellectual Property Office for application 201010611921.3 (Jan. 13, 2014).

Non-Final Office Action for U.S. Appl. 13/272,768 (Oct. 24, 2013) 12 pages.

Final Office Action for U.S. Appl. 13/272,768 (Feb. 24, 2014) 11 pages.

* cited by examiner

SPOT TIR LENS SYSTEM FOR SMALL HIGH-POWER EMITTER

CROSS-REFERENCES TO RELATED APPLICATIONS

This application is a continuation application of U.S. patent application Ser. No. 13/463,735, filed May 3, 2012, which claims priority to U.S. Provisional Patent Application No. 61/483,036 filed May 5, 2011, commonly assigned and incorporated herein by reference for all purposes. This application is also related to U.S. patent application Ser. No. 12/756,861, filed Apr. 8, 2010, now U.S. Pat. No. 8,384,097, U.S. patent application Ser. No. 13/338,912, filed Dec. 28, 2011, and U.S. patent application Ser. No. 13/338,936, filed Dec. 28, 2011, now U.S. Pat. No. 8,399,268, all of which are commonly owned and incorporated herein by reference in their entirety.

BACKGROUND OF THE INVENTION

The present disclosure relates generally to lighting devises and methods for manufacturing and in particular to an LED-based high-power narrow beam light source for various applications.

As light-emitting diode (LED)-based lighting sources become popular, more customers are demanding high-power, narrow beam light sources. For example, in some high bay lighting applications, sufficient light may need to reach 12 meters or farther, and in some stage lighting applications, sufficient light may need to reach 40 to 60 meters. Conventional light apparatus for these applications often use large emitters and a reflector housing. The reflector is needed, because it would be difficult to use a very large secondary lens, e.g., a TIR secondary lens, with such large emitters. Conventional approaches have their limitations, as described in more detail below.

Therefore, it would be desirable to provide an improved LED-based light source.

BRIEF SUMMARY OF THE INVENTION

Embodiments of the present invention provide techniques related generally to lighting systems based on light-emitting-diodes (LEDs). More particularly, embodiments of the present invention provide a total-internal-reflection (TIR) lens system that is preferably integrated with a small and high-power LED emitter. In some embodiments, the lighting systems can achieve ultra high lux at long distances using a single emitter. Merely by way of example, a spot TIR lens system integrated with an 80 W emitter is described for high bay lighting or stage lighting applications. But it will be recognized that the invention has a much broader range of applicability.

According to some embodiments of the present invention, a lamp includes a single emitter structure having a substrate with 25 or more light emitting diodes (LEDs) arranged thereon and a power rating of 80 Watts or more, a total internal reflection (TIR) lens, and a holder. The lens includes an optical body member having a substantially straight interior open channel in a lower portion thereof, the interior open channel having a lower opening for accommodating the single emitter structure. The optical body member has a step-shaped upper surface defining an increasingly wider cavity extending from an interior portion to an upper opening in of the optical body and a plurality of refractive surface regions disposed on the step-shaped upper surface of the optical body. The holder has a concave interior surface shaped to accommodate the optical body member and a convex exterior surface. The holder also has a first opening disposed to surround the lower opening of the optical body member and a second opening opposite the first opening, wherein the optical body member is insertable into the holder through the second opening. The holder further also includes a plurality of tabs disposed along an inside rim of the holder and configured for radial compression fit with a flange of the lens, a finger-width sized cut-out, and three or more support members disposed surrounding the first opening of the holder and configured for centering the optical body member with respect to the single emitter structure.

In an embodiment of the above lamp, the lens includes a mixture of hardener over base resin, with a weight ratio of hardener over base resin less than 6. In a specific embodiment, the base resin is PMMA and a weight ratio of the hardener over base resin of about 4.1 to 2.1. In another embodiment, the base resin is epoxy and a weight ratio of the hardener over base resin of about 4.1 to 2.1. In yet another embodiment, the base resin is silicone and a weight ratio of the hardener over base resin of about 4.1 to 2.1.

In some embodiments of the above lamp, the lamp is configured to provide uniform color light at three meters or farther. In an embodiment, the lamp is configured to provide FWHW (full width half max) of 15 degrees, with 80% optical efficiency, wherein the optical efficiency is defined as the ratio of the light output through the secondary TIR lens to the light output of the emitter. In some embodiment, the lamp is characterized by a diameter of 80 mm and a height of 50 mm.

According to another embodiment of the above lamp, a method for forming the lamp includes forming the lens by molding a mixture of hardener over base resin, with a weight ratio of hardener over base resin less than 6. In an embodiment, the base resin is PMMA and a weight ratio of the hardener over base resin of about 4.1 to 2.1. In another embodiment, the base resin is epoxy or silicone and a weight ratio of the hardener over base resin of about 4.1 to 2.1.

According to some other embodiments of the invention, a lamp, includes a single emitter structure having a substrate with a plurality light emitting diodes (LEDs) arranged thereon, a total internal reflection (TIR) lens, and a holder. The lens includes an optical body member having a substantially straight interior open channel in a lower portion thereof, the interior open channel having a lower opening for accommodating the single emitter structure. The optical body member has an upper surface defining an increasingly wider cavity extending from an interior portion to an upper opening in of the optical body and a plurality of refractive surface regions disposed on the upper surface of the optical body. The holder having a concave interior surface shaped to accommodate the optical body member and a convex exterior surface, the holder having a first opening disposed to surround the lower opening of the optical body member and a second opening opposite the first opening, wherein the optical body member is insertable into the holder through the second opening. The holder also has a plurality of tabs disposed along an inside rim of the holder and configured for radial compression fit with a flange of the lens and three or more support members disposed surrounding the first opening of the holder and configured for centering the optical body member with respect to the single emitter structure.

In an embodiment of the above lamp, the upper surface of the optical body member includes a plurality of steps. In another embodiment, the lamp also includes a plurality of refractive surface regions disposed on upper surface of the optical body.

In an embodiment of the above lamp, the lens comprises a mixture of hardener over base resin, with a weight ratio of hardener over base resin 4.1 to 2.1. In another embodiment, the lens includes a mixture of hardener over base resin, with a weight ratio of hardener over base resin between 1.5:1 to 2.5:1.

According to some other embodiments of the invention, a lamp includes a single emitter structure having a substrate with 25 or more light emitting diodes (LEDs) arranged thereon and a power rating of 80 Watts or more, a total internal reflection (TIR) lens with a plurality of refractive surface regions disposed on the step-shaped upper surface of the optical body, and a holder having a plurality of tabs disposed along an inside rim of the holder and configured for radial compression fit with a flange of the lens, and three or more support members configured for centering the optical body member with respect to the single emitter structure. In a specific embodiment, the lens includes a mixture of hardener over base resin, with a weight ratio of hardener over base resin less than 6. In another embodiment, the lens includes a mixture of hardener over base resin, with a weight ratio of hardener over base resin between 1.5:1 to 2.5:1.

According to yet another embodiment of the invention, a method for forming a lens includes forming the lens by molding a mixture of hardener over base resin with a weight ratio of hardener over base resin less than 6. In a specific embodiment, the weight ratio of hardener over base resin between 1.5:1 to 2.5:1. In another embodiment, the weight ratio of hardener over base resin of 4.1:2.1.

The following detailed description together with the accompanying drawings will provide a better understanding of the nature and advantages of the present invention.

DETAILED DESCRIPTION OF THE INVENTION

Embodiments of the present invention provide techniques related generally to lighting systems based on light-emitting-diodes (LEDs). More particularly, embodiments of the present invention provide a total-internal-reflection (TIR) lens system that is preferably integrated with a small and high-power LED emitter. In some embodiments, the lighting systems can achieve ultra high lux at long distances using a single emitter. Merely by way of example, a spot TIR lens system integrated with an 80 W emitter is described for high bay lighting or stage lighting applications. But it will be recognized that the invention has a much broader range of applicability.

For example, in some high bay lighting applications, sufficient light may need to reach 12 meters, and in some stage lighting applications, sufficient light may need to reach 40 to 60 meters. Conventional light apparatus for these applications often use large emitters and a reflector housing. The reflector is needed, because it would be difficult to use a very large secondary lens, e.g., a TIR secondary lens, with such large emitters. Embodiments of the present invention, however, provide a TIR lens integrated with a single small and high-power LED emitter. Embodiments of the invention incorporate properties such as the light collimating capability of the TIR secondary lens and the high-power small emitter to enable the high lux at long distances.

In some embodiments, the lighting system includes a 25-die emitter, which can have a size as small as 12 mm by 12 mm and can have a power rating of 80 W. The emitter includes 25 LED dice disposed on a multi-layered substrate. The small multi-layered substrate uses materials having matching thermal and mechanical properties that enable it to maintain its flatness without distortion when the attached emitter has power consumption as high as 80 W. A similar multi-layered substrate is described in commonly-owned U.S. patent application Ser. No. 12/756,861, whose entire content is incorporated by reference herein.

In some embodiments, the lighting system can have FWHW (full width half max) of 15 degrees, with 80% optical efficiency, and excellent intensity and color uniform at 3 meters and above. Here, the 80% optical efficiency is defined as the ratio of the light output through the secondary TIR lens to the light output of the emitter.

In a specific embodiment, the multi-layered substrate with controlled CTE (coefficient of thermal expansion) allows emitters to use a glass primary lens without cracking. To the best knowledge of the inventors of this invention, it is difficult in a conventional lighting apparatus to use a glass lens on a high-powered LED or emitter, because thermal expansion mismatch can cause delamination or cracking.

More details of the lighting apparatus and various components are described below.

Figure 6:
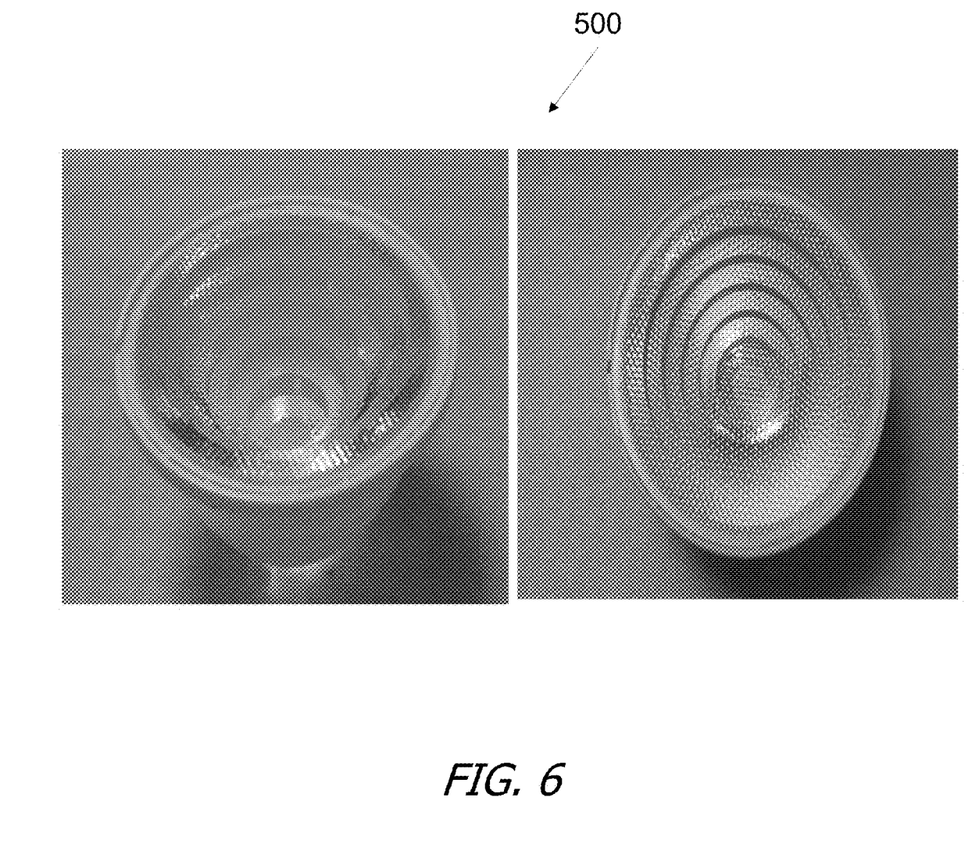
FIG. 6 shows another perspective view and top view of the lens of FIG. 5.

Optical Design:

Due to the size of the 80 W emitter, it is a challenging task to design an optics for this light source with specifications requiring high optical efficiency and excellent intensity and color uniformity at a narrow angle beam. FIG. 6 shows a perspective view and a top view of a TIR lens according to an embodiment of the invention. This innovative optical design combines a lens that features TIR property that ensures high efficiency, micro-lens on top to provide good uniformity, large size to achieve narrow beam angle, and step structures to reduce lens mass. When a lens is large, the optical path is long. Therefore, the transmission loss becomes evident. In order to minimize the loss, the center portion of the lens is cut into steps, which does not alter the optical performance in terms of beam angle and beam uniformity. However, it reduces the mass of the lens, and reduces the transmission loss. It also makes manufacturing process shorter and easier. The combination of all the above features makes this lens unique for applications such as high bay lighting and stage lighting, which requires ultra high central lux with and superb color and intensity uniformity at long distance.

The following table summarized the optical performance of a specific TIR lens system according to an embodiment of the present invention.

| Lumens of 80 W emitter | | 700 mA | 1000 mA |
|---|---|---|---|
| | WW | 3000 | 3800 |
| | NW | 3650 | 4600 |
| | CW | 4300 | 5500 |
| Optical efficiency (%) | | 81 | |
| On axis optical efficiency (Cd/lm) | | 8 | |
| View angle (FWHM, deg) | | 15 | |
| Dimensions (mm) | | Diameter: 80 | |
| | | Height: 50 | |

In contrast, conventional optics lens system tends to be much larger and cannot provide the narrow view angle of 15 degrees described above. Some examples of conventional systems are listed in the table below.

| | Dimensions | View angle |
|---|---|---|
| Conventional System #1 | Diameter: 450 | 170 |
| | Height: 478 | |
| Conventional System #2 | Diameter: 500 | NA |
| | Height: 580 | |

It can be seen that the TIR lens system in embodiments of the invention is much smaller than conventional optics, e.g. 80×50 mm versus about 500×500 mm. An implication of the large size of conventional system is that it usually requires reflectors in the lens system. In contrast, in embodiments of the present invention, a secondary TIR lens can be used. The narrow view angle benefits from the small emitter and TIR lens. On the other hand, even though the 80×50 mm TIR lens enables the small lighting system, a single piece TIR lens of the size of 80×50 mm is considered relatively large in lens manufacturing and has not be available in the market, to the best knowledge of the inventors of this invention. As a result, a manufacturing method for such a large lens is quite different from conventional methods, as described below.

Manufacturing Method of the TIR Lens:

In some embodiments, methyl methacrylate "synthetic resin" for casting (simply the bulk liquid chemical) may be used in conjunction with a polymerization catalyst such as MEKP, to produce hardened transparent PMMA in any shape, from a mold. During the mold process, polymerization catalyst (the hardener) is added to the base resin for curing purpose. After mixing two materials, the chemical reaction will generate heat and the amount of heat is dependent on volume of the lenses and ambient temperature. The heat can accumulate enough to cause browning of the lens, which can result in significant transmission loss.

The inventors of this invention have discovered that in order to successfully mold a lens with relative large sizes, it is important to understand the thermal property of the material and to optimize the manufacturing process. Otherwise, the overheating of the material will cause the browning of the lens, which will diminish lens efficiency. If the thermal stress of the material is not uniform across the lens, it will reduce material transmission efficiency; therefore, it also reduces optical efficiency significantly.

The inventors of this invention have discovered that to mold a large lens, the ratio of hardener/base resin needs to be optimized. For example, a lower ratio is needed for a large (volume) lens, and a lower ratio is needed when the ambient temperature is high.

In some embodiments, a lower ratio of hardener/base resin is used, and the resulting lens exhibits a lower transmission loss. Typically base resin and hardener ratios used in conventional methods are not suitable for making large lenses. Some examples of conventional methods are shown in the table below.

| | PMMA | Epoxy | Silicone |
|---|---|---|---|
| Weight mixing ratio: Base resin to hardener | 2:1 to 4:1 | 2:1 to 4:1 | 2:1 to 4:1 |

In contrast, the manufacturing of the large TIR lens described here uses a ratio range from 6:1 to 10:1.

In addition to the secondary TIR lens described here, other apparatus, such as Par 38 lenses and Par 30 lenses, can also benefit by the martial optimization process because of their sizes.

Figure 7:
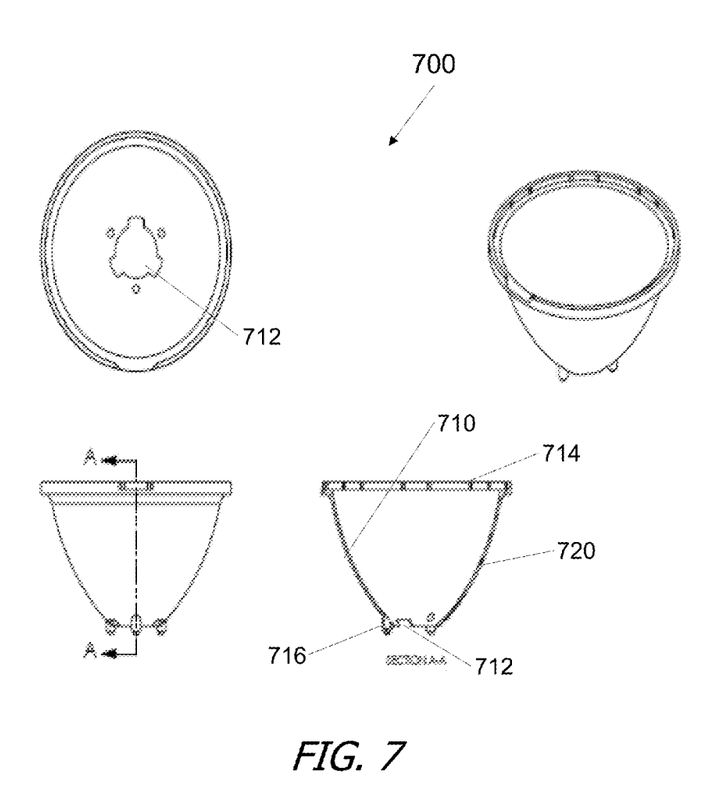
FIG. 7 illustrates various views of a lens holder according to an embodiment of the invention.
Figure 8:
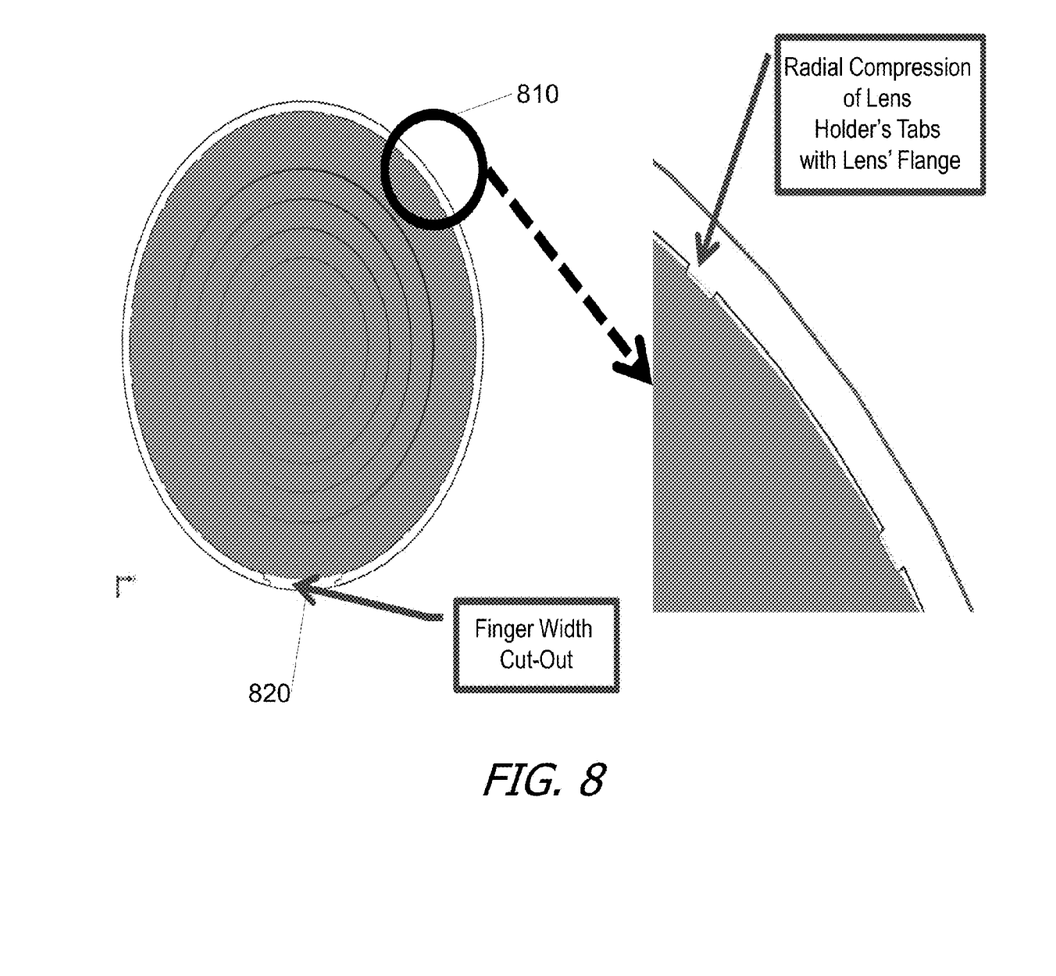
FIG. 8 illustrates top views of the lens holder of FIG. 7 according to an embodiment of the invention.
Figure 9:
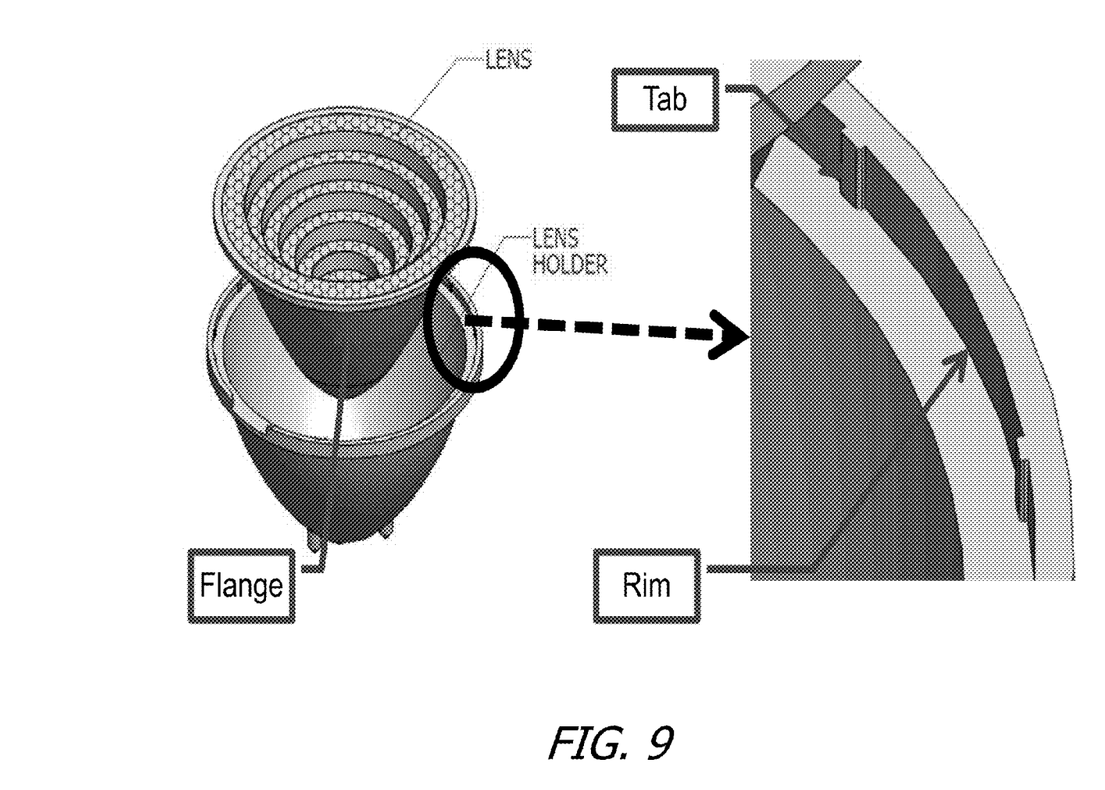
FIG. 9 illustrates a perspective view of a lens with a holder and a detailed view of an upper portion of the holder according to an embodiment of the invention.

Mechanical Retention Features:

In embodiments of the present invention, the lens holder is designed to meet at least the following two requirements: 1) firmly hold the lens, and 2) allow lens to be inserted and extracted from lens holder by hand or with light push/pull force. The lens is held firmly in lens holder by light radial compression fit between the flange diameter of the lens and the tabs on the inside rim of the lens holder. In a specific embodiment, on the inside rim of the lens holder, there are 14 tabs uniformly placed around the perimeter of the rim. The size and spacing of the tabs were designed and optimized to achieve this light press fit. On the perimeter of the lens holder's rim, there is a finger width sized cut-out that does two things: 1) facilitate the flexing of the lens holder when extracting lens from the Holder, and 2) allows finger nail (or the edge of a small flat screw driver) to be inserted and used to pry out the lens from lens holder. Some of the features describe above are illustrated in FIGS. 7-9.

Conventional lens holders often have clips for holding the lens in the holder, and the clips often protrude from the rim. The clips are often broken when the lens is taken out of the holder, preventing the holder from being re-used. In embodiments of the invention, the lens holder has no protruding clips and can be re-used after the lens is taken out of the lens holder.

Examples of specific embodiments according to embodiments of the invention are described below.

Figure 1:
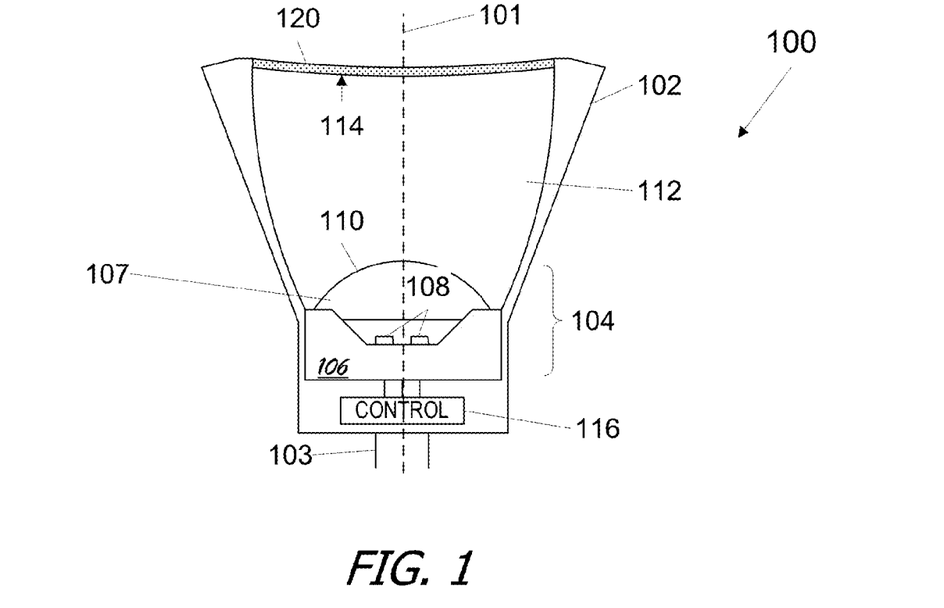
FIG. 1 is a simplified cross-sectional side view of an LED-based lamp according to an embodiment of the present invention.

FIG. 1 is a simplified cross-sectional side view of an LED-based lamp 100 according to an embodiment of the present invention. Lamp 100, which is cylindrically symmetric about an axis 101, has a housing 102, which can be made of aluminum, other metals, plastic, and/or other suitable material. Housing 102 holds the various components of lamp 100 together and can provide a convenient structure for a user to grip lamp 100 during installation or removal from a light fixture. The exterior of housing 102 can include mechanical and/or electrical fittings 103 to secure lamp 100 into a light fixture and/or to provide electrical power for producing light. In some embodiments, housing 102 may include fins or other structures to facilitate dissipation of heat generated during operation of lamp 100. The exterior shape of housing 102 can be made to conform to a standard lamp form factors.

Within housing 102 is an emitter package 104. Package 104 includes a substrate 106 in which is formed with a recess 107. Substrate 106 can be a multilayer structure with ceramic and metal layers. Examples are described in U.S. Patent Application Pub. No. 2010/0259930, the disclosure of which is incorporated herein by reference. Other substrates can also be used.

LEDs 108 are mounted on substrate 106 within recess 107. In some embodiments, the top surface of recess 107 is patterned with a number of metal pads, each accommodating a single LED 108. Each LED 108 can be a separate semiconductor die structure fabricated to produce light of a particular color in response to electrical current. In some embodiments, LEDs 108 can be covered with a material containing a color-shifting phosphor so that LED 108 produces light of a desired color. For example, a blue-emitting LED die can be covered with a material containing a yellow phosphor; the emerging mixture of blue and yellow light is perceived as white light having a particular color temperature. As described below, in some embodiments different ones of LEDs 108 can produce light of different colors; LEDs 108 need not be identical.

Lamp 100 also includes a primary lens 110, which can be made of glass, plastic, or other optically transparent material, that is positioned to direct light emitted from LEDs 108 into secondary optics 112. Secondary optics 112 advantageously include a total-internal-reflection (TIR) lens that also provides mixing of the colors of light emitted from LEDs 108 such that the light beam exiting through front face 114 has a uniform color. Examples of suitable lenses are described in U.S. Patent Application Pub. No. 2010/0091491, the disclosure of which is incorporated herein by reference; other color-mixing lens designs may also be used.

In some embodiment, optionally lamp 100 can also include a diffusive coating 120 on front face 114 of lens 112. Coating 120 provides further color mixing of the light exiting secondary optics 112 without requiring additional space, a significant consideration when designing a lamp with a compact form factor. Various coatings 120 can be used. In some embodiments, coating 120 can be a holographic diffuser film, such as a light-shaping diffuser film made by Luminit Co. of Torrance, Calif. (website at www.lumintco.com). In these films, the diffusive coating is provided as a diffusive material disposed in a desired pattern on an optically transparent substrate film (e.g., acrylic, polyester, polycarbonate, glass or fused silica). The film is easily applied to front face 114. Other types of coatings can also be applied; for example, diffusive material can be applied directly to front face 114.

In some embodiments, lamp 100 includes a control circuit 116 that controls the power provided from an external power source (not shown) to LEDs 108. In some embodiments, control circuit 116 allows different amounts of power to be supplied to different LEDs 108, allowing for tuning of the color as described below.

Figure 2:
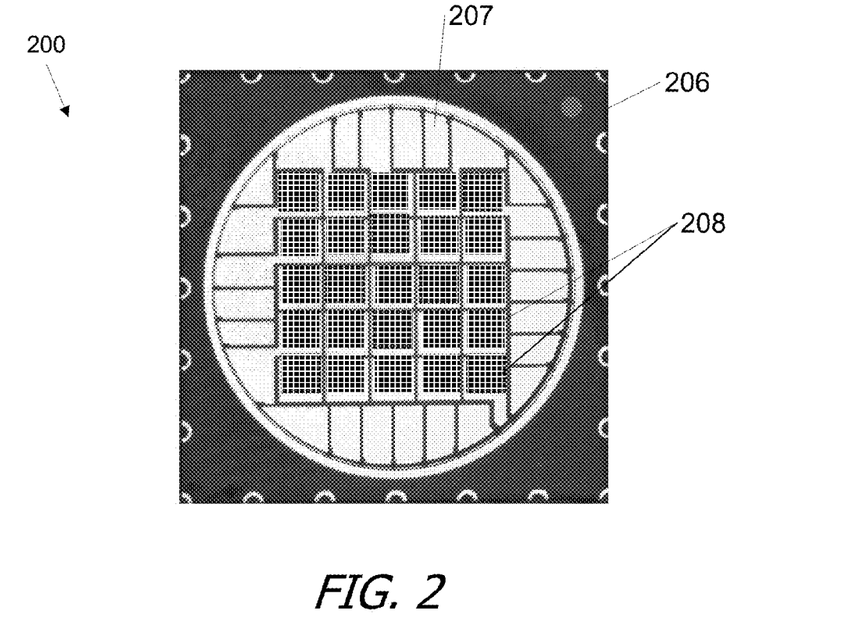
FIG. 2 is a simplified top view of a 25-die emitter implementing emitter package 104 of FIG. 1 according to a specific embodiment of the present invention.

FIG. 2 is a simplified top view of a 25-die emitter 200 implementing emitter package 104 of FIG. 1 according to a specific embodiment of the present invention. In this embodiment, substrate 206 includes a recess 207 in which 25 LEDs 208 are disposed in a 5×5 grid as shown.

In some embodiments, emitter 200 can include LED dice of different colors. For example, each white LED die can include a blue light LED chip with a wavelength-converting layer disposed directly thereon, and each red LED die includes a red light LED chip. In some embodiments, the white LED dice are selected to produce a cool white, warm white, or an off-white color, e.g., a greenish white color, with a desired amount of wavelength-converting material is disposed directly on the blue light LED chip. When light from the different color dice is mixed by mixing lens 112, a desired light color temperature can be achieved.

As used herein, "cool" white and "warm" white refer to the color temperature of the light produced. Cool white, for example, can correspond to a color temperature above, e.g., about 4000 K, while warm white can correspond to a color temperature below, e.g., about 3000 K. Further, the terms "white light" or "white color", as used herein, can refer to a broad range of whitish colors or light, for example, cool white, warm white, greenish white, and reddish white, etc.

In some embodiments, LEDs 208 are advantageously provided with electrical connections such that different groups of the LEDs are independently addressable, i.e., different currents can be supplied to different groups of LEDs. These electrical connections can be implemented, e.g., using traces disposed on the surface of substrate 206 and/or between electrically insulating layers of substrate 206.

Where the different LED groups are interpedently addressable, package 200 provides an emitter that can be tuned to produce light of a desired color (e.g., color temperature) by adjusting the relative current delivered to different groups of LEDs 208, e.g., using control circuit 116. Techniques for tuning an emitter have been described, e.g., in U.S. patent application Ser. No. 13/106,808 and U.S. patent application Ser. No. 13/106,810, the disclosures of which are incorporated herein by reference.

In other embodiments, the color temperature of the light produced by the lamp can be controlled by selecting the LEDs such that the desired color (e.g., color temperature) is achieved when equal currents are supplied to all LEDs 208. In other embodiments, the color temperature of the light produced by the lamp can be controlled by selecting white LED dice (W) and red LED dice (R) such that the desired color (e.g., color temperature) is achieved when equal currents are supplied to all LEDs. Selection of LEDs for a given substrate can be done by testing individual LED dice prior to substrate assembly to determine the color temperature of light produced and binning the LED dice according to color temperature. Accordingly, color tuning by adjusting the relative current supplied to different groups of LEDs is not required.

In the embodiment of FIG. 2, the LEDs are arranged to provide a roughly uniform circular distribution of the LEDs. That is, the white and red LEDs are intermixed and arranged such that warm and cool light are produced in approximately equal intensities across different parts of the emitter substrate. This allows for optimal color mixing using secondary optics such as TIR lens 112 of FIG. 1, to produce a uniformly white light from LEDs that are not uniform in color.

With reference to the description of lamp 100 above, various specific embodiments are described below.

Figure 3:
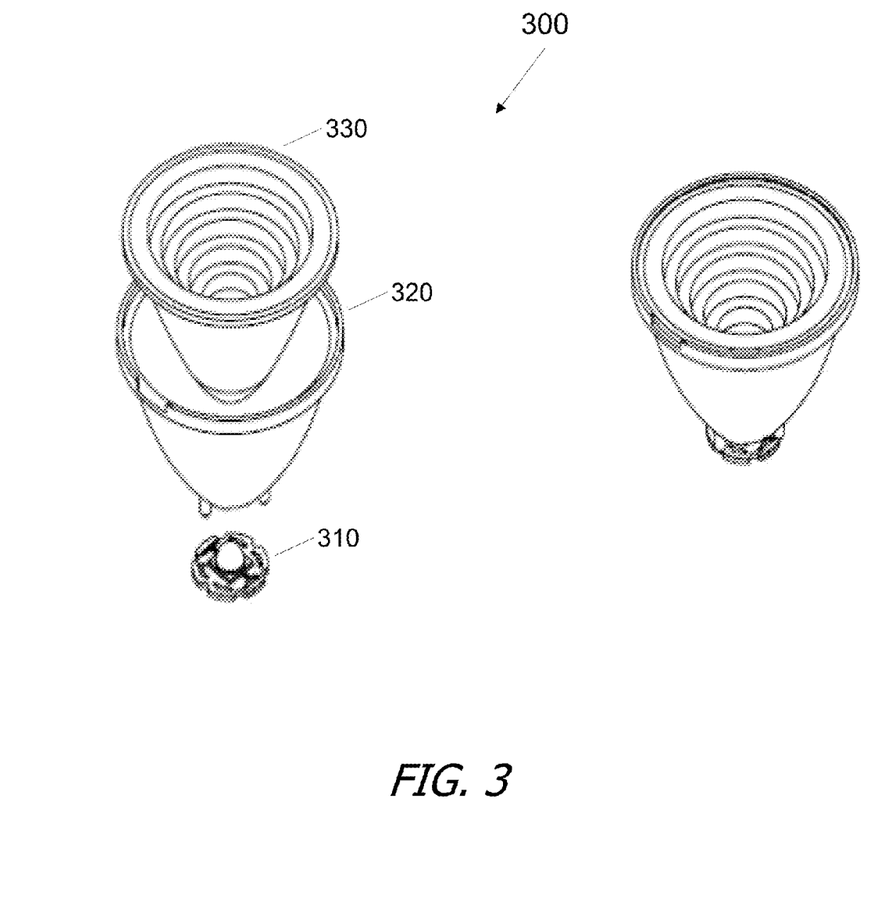
FIG. 3 illustrates a perspective view of an exemplary lamp with an emitter, a holder, and a lens, separately and as an assembled lamp, respectively, according to an embodiment of the invention.
Figure 4:
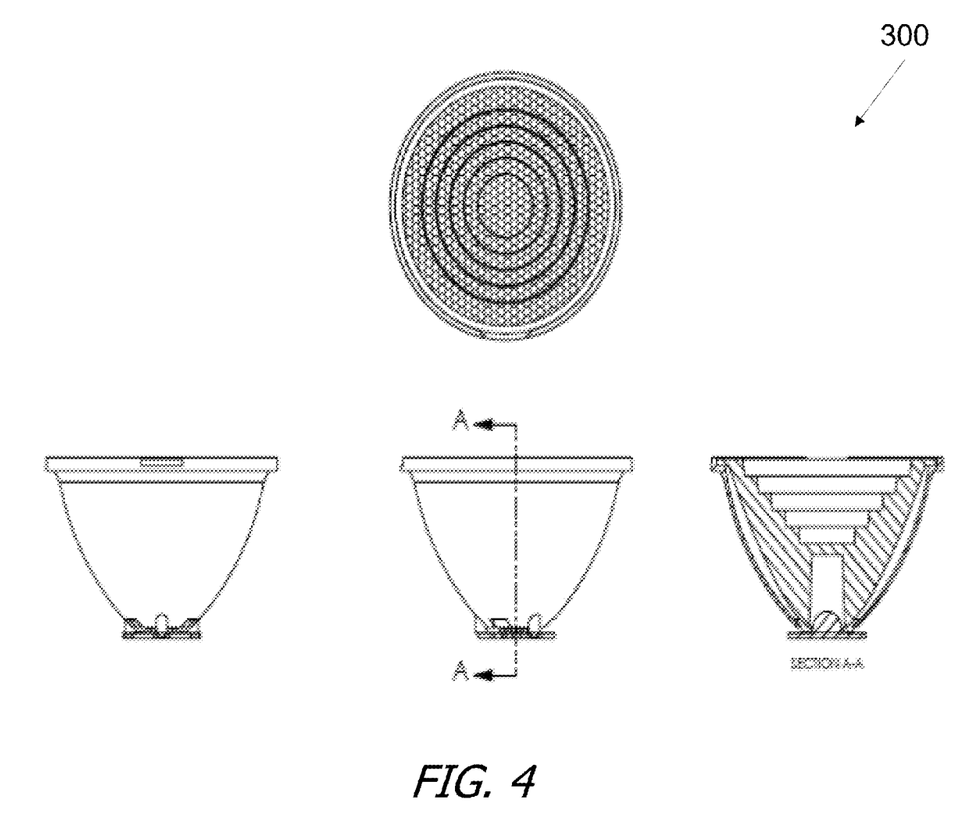
FIG. 4 shows a top view, a side view, and a cross-sectional view of the lamp of FIG. 3, respectively.

According to some embodiments of the present invention, a lamp includes a single emitter structure having a substrate with a plurality of light emitting diodes (LEDs) arranged thereon and, a total internal reflection (TIR) lens, and a holder. FIG. 3 illustrates a perspective view of an exemplary lamp 300 with an emitter 310, a holder 320, and a lens 330 separately and as an assembled lamp, respectively. In some embodiment, the emitter can have 25 or more light emitting diodes (LEDs) and a power rating of 80 Watts or more. FIG. 4 shows a top view, a side view, and a cross-sectional view of lamp 300, respectively.

Figure 5:
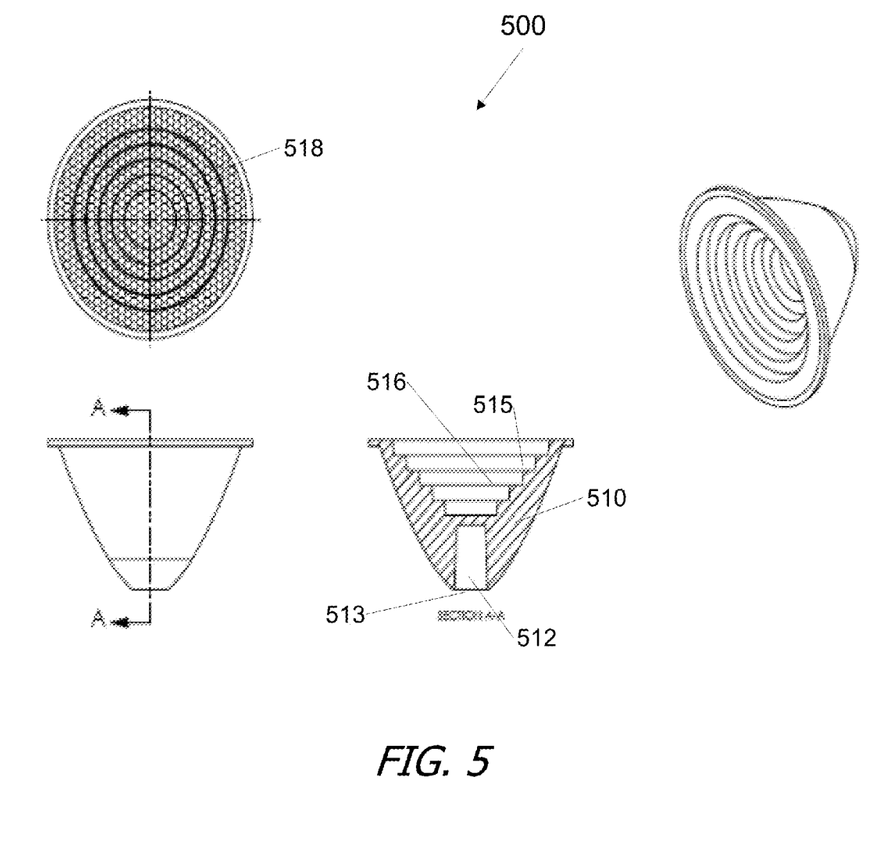
FIG. 5 shows a top view, side view, and a cross-sectional view of a lens according to an embodiment of the invention.

FIG. 5 shows a top view, side view, and a cross-sectional view of a lens 500 according to an embodiment of the invention. As shown, lens 500 includes an optical body member 510 having a substantially straight interior open channel 512 in a lower portion thereof. The interior open channel 512 has a lower opening 513 for accommodating the single emitter structure. The optical body member has a step-shaped upper surface 515 defining an increasingly wider cavity 516 extending from an interior portion to an upper opening in of the optical body and a plurality of refractive surface regions 518 disposed on the step-shaped upper surface of the optical body. FIG. 6 shows another perspective view and top view of lens 500.

FIG. 7 illustrates various views of a lens holder according to an embodiment of the invention. As shown, holder 700 has a concave interior surface 710 shaped to accommodate the optical body member of the lens and a convex exterior surface 720. The holder also has a first opening 712 disposed to surround the lower opening of the optical body member and a second opening 714 opposite the first opening, wherein the optical body member is insertable into the holder through the second opening. Holder 700 also has three or more support members 716 disposed surrounding the first opening of the holder and configured for centering the optical body member with respect to the single emitter structure. As illustrated in FIG. 8, the holder further also includes a plurality of tabs 810 disposed along an inside rim of the holder and configured for radial compression fit with a flange of the lens. The holder also has a finger-width sized cut-out 820 for handling the insertion and removal of the lens into and out of the holder.

Figure 10:
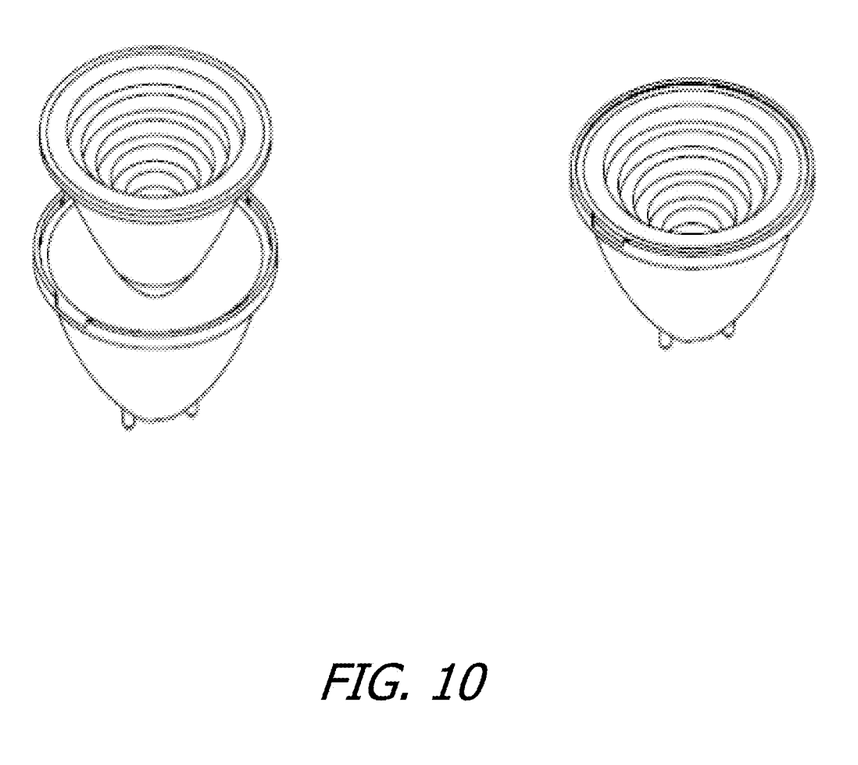
FIG. 10 illustrates perspective views of the lens and holder combination in separate and assembled positions, respectively, according to an embodiment of the invention.
Figure 11:
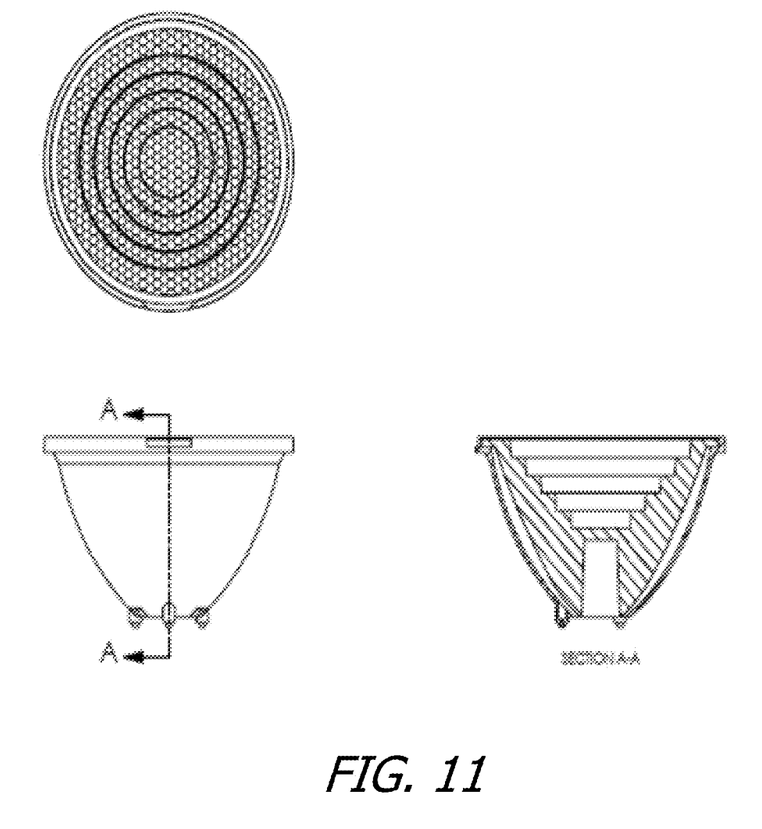
FIG. 11 illustrates a top view and a cross-section view of the lens and holder combination in an assembly according to an embodiment of the invention.

FIG. 9 illustrates a perspective view of a lens with a holder and a detailed view of an upper portion of the holder. Specifically the flange of the lens, and the tabs and rim of the holder are shown. FIG. 10 illustrates perspective views of the lens and holder combination in separate and assembled positions, respectively, according to an embodiment of the invention. FIG. 11 illustrates a top view and a cross-section view of the lens and holder combination in an assembly according to an embodiment of the invention.

In an embodiment of the above lamp, the lens includes a mixture of hardener over base resin, with a weight ratio of hardener over base resin less than 6. In a specific embodiment, the base resin is PMMA and a weight ratio of the hardener over base resin of about 4.1 to 2.1. In another embodiment, the base resin is epoxy and a weight ratio of the hardener over base resin of about 4.1 to 2.1. In yet another embodiment, the base resin is silicone and a weight ratio of the hardener over base resin of about 4.1 to 2.1.

In some embodiments of the above lamp, the lamp is configured to provide uniform color light at three meters or farther. In an embodiment, the lamp is configured to provide FWHW (full width half max) of 15 degrees, with 80% optical efficiency, wherein the optical efficiency is defined as the ratio of the light output through the secondary TIR lens to the light output of the emitter. In some embodiment, the lamp is characterized by a diameter of 80 mm and a height of 50 mm.

According to some other embodiments of the invention, a lamp includes a single emitter structure having a substrate with 25 or more light emitting diodes (LEDs) arranged thereon and a power rating of 80 Watts or more, a total internal reflection (TIR) lens with a plurality of refractive surface regions disposed on the step-shaped upper surface of the optical body, and a holder having a plurality of tabs disposed along an inside rim of the holder and configured for radial compression fit with a flange of the lens, and three or more support members configured for centering the optical body member with respect to the single emitter structure. In a specific embodiment, the lens includes a mixture of hardener over base resin, with a weight ratio of hardener over base resin less than 6. In another embodiment, the lens includes a mixture of hardener over base resin, with a weight ratio of hardener over base resin between 1.5:1 to 2.5:1. Some of the above features are illustrated in the figures described above.

According to yet another embodiment of the invention, a method for forming a lens includes forming the lens by molding a mixture of hardener over base resin with a weight ratio of hardener over base resin less than 6. In a specific embodiment, the weight ratio of hardener over base resin between 1.5:1 to 2.5:1. In another embodiment, the weight ratio of hardener over base resin of 4.1:2.1.

According to another embodiment of the above lamp, a method for forming the lamp includes forming the lens by molding a mixture of hardener over base resin, with a weight ratio of hardener over base resin less than 6. In an embodiment, the base resin is PMMA and a weight ratio of the hardener over base resin of about 4.1 to 2.1. In another embodiment, the base resin is epoxy or silicone and a weight ratio of the hardener over base resin of about 4.1 to 2.1.

Thus, although the invention has been described with respect to specific embodiments, it will be appreciated that these examples are not limiting, and that the invention is intended to cover all modifications and equivalents within the scope of the disclosure.

What is claimed is:

1. A lamp, comprising:
    a single emitter structure having a substrate with 25 or more light-emitting diodes (LEDs) arranged thereon and a power rating of 80 Watts or more;
    a total-internal-reflection (TIR) lens, the lens including:
        an optical body member having a substantially straight interior open channel in a lower portion thereof, the interior open channel having a lower opening for accommodating the single emitter structure;
        the optical body member having a step-shaped upper surface defining an increasingly wider cavity extending from an interior portion to an upper opening in of the optical body; and
        a plurality of refractive surface regions disposed on the step-shaped upper surface of the optical body; and
    a holder having a concave interior surface shaped to accommodate the optical body member and a convex exterior surface, the holder having a first opening disposed to surround the lower opening of the optical body member and a second opening opposite the first opening, wherein the optical body member is insertable into the holder through the second opening, the holder further including:
        a plurality of tabs disposed along an inside rim of the holder and configured for radial compression fit with a flange of the lens;
        a finger-width sized cut-out; and
        three or more support members disposed surrounding the first opening of the holder and configured for centering the optical body member with respect to the single emitter structure.

2. The lamp of claim 1, wherein the lens comprises a mixture of hardener over base resin, with a weight ratio of hardener over base resin less than 6.

3. The lamp of claim 2, wherein the base resin is PMMA and a weight ratio of the hardener over base resin of about 4.1 to 2.1.

4. The lamp of claim 2, wherein the base resin is epoxy and a weight ratio of the hardener over base resin of about 4.1 to 2.1.

5. The lamp of claim 2, wherein the base resin is silicone and a weight ratio of the hardener over base resin of about 4.1 to 2.1.

6. The lamp of claim 1, wherein the lamp is configured to provide uniform color light at three meters or farther.

7. The lamp of claim 1, wherein the lamp is configured to provide FWHW (full width half max) of 15 degrees, with 80% optical efficiency, wherein the optical efficiency is defined as the ratio of the light output through the secondary TIR lens to the light output of the emitter.

8. The lamp of claim 1, wherein the lamp is characterized by a diameter of 80 mm and a height of 50 mm.

9. A method for forming the lamp of claim 1, comprising forming the lens by molding a mixture of hardener over base resin, with a weight ratio of hardener over base resin less than 6:1.

10. The method of claim 9, wherein the base resin is PMMA and a weight ratio of the hardener over base resin of about 4.1 to 2.1.

11. The method of claim 9, wherein the base resin is epoxy or silicone and a weight ratio of the hardener over base resin of about 4.1 to 2.1.

12. A lamp, comprising:
a single emitter structure having a substrate with a plurality light-emitting diodes (LEDs) arranged thereon;
a total-internal-reflection (TIR) lens, the lens including:
an optical body member having a substantially straight interior open channel in a lower portion thereof, the interior open channel having a lower opening for accommodating the single emitter structure;
the optical body member having an upper surface defining an increasingly wider cavity extending from an interior portion to an upper opening in of the optical body; and
a plurality of refractive surface regions disposed on the upper surface of the optical body; and
a holder having a concave interior surface shaped to accommodate the optical body member and a convex exterior surface, the holder having a first opening disposed to surround the lower opening of the optical body member and a second opening opposite the first opening, wherein the optical body member is insertable into the holder through the second opening, the holder further including:
a plurality of tabs disposed along an inside rim of the holder and configured for radial compression fit with a flange of the lens; and
three or more support members disposed surrounding the first opening of the holder and configured for centering the optical body member with respect to the single emitter structure.

13. The lamp of claim 12, wherein the upper surface of the optical body member comprises a plurality of steps.

14. The lamp of claim 13, further comprising a plurality of refractive surface regions disposed on upper surface of the optical body.

15. The lamp of claim 12, wherein the lens comprises a mixture of hardener over base resin, with a weight ratio of hardener over base resin 4.1 to 2.1.

16. The lamp of claim 12, wherein the lens comprises a mixture of hardener over base resin, with a weight ratio of hardener over base resin between 1.5:1 to 2.5:1.

17. A method for forming the lamp of claim 12, comprising forming the lens by molding a mixture of hardener over base resin, with a weight ratio of hardener over base resin less than 6:1.

18. The method of claim 17, wherein the lens comprises a mixture of hardener over base resin, with a weight ratio of hardener over base resin between 1.1:1 to 2.5:1.

19. A lamp, comprising:
a single emitter structure having a substrate with 25 or more light-emitting diodes (LEDs) arranged thereon and a power rating of 80 Watts or more;
a total-internal-reflection (TIR) lens, the lens including a plurality of refractive surface regions disposed on a step-shaped upper surface of an optical body; and
a holder having a plurality of tabs disposed along an inside rim of the holder and configured for radial compression fit with a flange of the lens, and three or more support members configured for centering the optical body member with respect to the single emitter structure.

20. The lamp of claim 19, wherein the lens comprises a mixture of hardener over base resin, with a weight ratio of hardener over base resin less than 6.

21. The lamp of claim 19, wherein the lens comprises a mixture of hardener over base resin, with a weight ratio of hardener over base resin between 1.5:1 to 2.5:1.

22. A lens assembly, comprising:
a total-internal-reflection (TIR) lens, the lens including:
an optical body member having a substantially straight interior open channel in a lower portion thereof, the interior open channel having a lower opening for accommodating a light source;
the optical body member having a step-shaped upper surface defining an increasingly wider cavity extending from an interior portion to an upper opening in of the optical body; and
a plurality of refractive surface regions disposed on the step-shaped upper surface of the optical body; and
a holder having a concave interior surface shaped to accommodate the optical body member and a convex exterior surface, the holder having a first opening disposed to surround the lower opening of the optical body member and a second opening opposite the first opening, wherein the optical body member is insertable into the holder through the second opening, the holder further including:
a plurality of tabs disposed along an inside rim of the holder and configured for radial compression fit with a flange of the lens;
a finger-width sized cut-out; and
three or more support members disposed surrounding the first opening of the holder and configured for centering the optical body member with respect to the light source.

23. The lens assembly of claim 22, wherein the lens comprises a mixture of hardener over base resin, with a weight ratio of hardener over base resin less than 6.

24. The lens assembly of claim 23, wherein the base resin is PMMA and a weight ratio of the hardener over base resin of about 4.1 to 2.1.

25. The lens assembly of claim 23, wherein the base resin is epoxy or silicone and a weight ratio of the hardener over base resin of about 4.1 to 2.1.

* * * * *